United States Patent
Roggero et al.

(10) Patent No.: US 9,706,007 B2
(45) Date of Patent: Jul. 11, 2017

(54) SYSTEM AND METHOD FOR QUERYING DISPARATE DATA SOURCES IN REAL TIME

(71) Applicants: Herve Roggero, Boca Raton, FL (US); James Joseph Mullis, Wellington, FL (US)

(72) Inventors: Herve Roggero, Boca Raton, FL (US); James Joseph Mullis, Wellington, FL (US)

(73) Assignee: BLUE SYNTAX CONSULTING LLC, Boca Raton, FL (US)

( * ) Notice: Subject to any disclaimer, the term of this patent is extended or adjusted under 35 U.S.C. 154(b) by 380 days.

(21) Appl. No.: 14/516,393

(22) Filed: Oct. 16, 2014

(65) Prior Publication Data
US 2015/0112985 A1    Apr. 23, 2015

Related U.S. Application Data

(60) Provisional application No. 61/892,100, filed on Oct. 17, 2013.

(51) Int. Cl.
| | | |
|---|---|---|
| G06F 17/30 | (2006.01) | |
| H04L 29/08 | (2006.01) | |
| H04L 29/06 | (2006.01) | |

(52) U.S. Cl.
CPC .......... *H04L 67/2823* (2013.01); *H04L 63/08* (2013.01)

(58) Field of Classification Search
CPC ................................................ G06F 17/30424
See application file for complete search history.

(56) References Cited

U.S. PATENT DOCUMENTS

| | | | | |
|---|---|---|---|---|
| 7,469,248 | B2 * | 12/2008 | Agrawal | G06F 17/30566 |
| 7,493,311 | B1 * | 2/2009 | Cutsinger | G06F 17/30545 |
| 8,694,532 | B2 * | 4/2014 | Freire | G06F 17/30557 |
| | | | | 707/769 |
| 2002/0143755 | A1 * | 10/2002 | Wynblatt | G06F 17/30545 |
| 2002/0184610 | A1 * | 12/2002 | Chong | G06F 8/20 |
| | | | | 717/109 |
| 2003/0167277 | A1 * | 9/2003 | Hejlsberg | G06F 9/46 |
| 2004/0010496 | A1 * | 1/2004 | Behrendt | H04L 67/28 |
| 2004/0117358 | A1 * | 6/2004 | von Kaenel | G06F 17/30241 |
| 2005/0216555 | A1 * | 9/2005 | English | G06Q 50/18 |
| | | | | 709/204 |
| 2005/0246716 | A1 * | 11/2005 | Smith | G06F 9/465 |
| | | | | 719/315 |

(Continued)

*Primary Examiner* — Noosha Arjomandi

(57) ABSTRACT

A system and method for querying disparate data sources in real time utilizes a plurality of listeners and at least one data adapter operated on a request proxy. A interface specific data query is received from a client account by the request proxy through a specific listener. The interface specific data query is formatted into an agnostic request object that is then forwarded to a specific adapter, wherein a specific method is determined from a plurality of methods for the specific adapter. The request proxy retrieves requested data from at least one data source through the specific adapter. The requested data is then formatted into an agnostic response object that can be cached on the request proxy. The agnostic response object is then formatted into a interface specific response stream by the request proxy and the interface specific response stream is sent to the client account through the specific listener.

17 Claims, 15 Drawing Sheets

(56) References Cited

U.S. PATENT DOCUMENTS

| | | | |
|---|---|---|---|
| 2006/0206903 A1* | 9/2006 | Lawrence | G06F 9/547 |
| | | | 719/313 |
| 2007/0192348 A1* | 8/2007 | Brodersen | G06F 17/30917 |
| 2008/0016502 A1* | 1/2008 | Henderson | G06F 17/30893 |
| | | | 717/143 |
| 2008/0208805 A1* | 8/2008 | Wang | G06F 17/30386 |
| 2009/0157629 A1* | 6/2009 | Gutlapalli | G06F 17/30011 |
| 2009/0248680 A1* | 10/2009 | Kalavade | G06Q 30/0267 |
| 2012/0095973 A1* | 4/2012 | Kehoe | G06F 8/70 |
| | | | 707/694 |
| 2012/0137307 A1* | 5/2012 | Sarferaz | G06Q 10/10 |
| | | | 719/317 |
| 2013/0041880 A1* | 2/2013 | Walter | G06F 17/30893 |
| | | | 707/708 |
| 2013/0179462 A1* | 7/2013 | Shrestha | G06F 19/321 |
| | | | 707/769 |
| 2014/0041055 A1* | 2/2014 | Shaffer | G06Q 10/10 |
| | | | 726/28 |
| 2014/0222819 A1* | 8/2014 | Dies | G06F 17/30707 |
| | | | 707/740 |

\* cited by examiner

SYSTEM AND METHOD FOR QUERYING DISPARATE DATA SOURCES IN REAL TIME The current application claims a priority to the U.S. Provisional Patent application Ser. No. 61/892,100 filed on Oct. 17, 2013.

FIELD OF THE INVENTION

The present invention relates generally to the field of information technology. More specifically, the present invention relates to the field of information technology as it relates to the field of data integration.

BACKGROUND OF THE INVENTION

Although companies store data in a relational database, many data sources are not stored in a relational format, such as flat files, Portable Document Format (PDF) files, mail, Lightweight Directory Access Protocol (LDAP) stores, social media posts, Hypertext Transfer Protocol (HTTP) documents, Excel among others. In addition, as systems become more efficient and need to integrate in an ever-increasing complex ecosystem of devices and hosting models, new unstructured storage formats are being created over time, such as Extensible Markup Language (XML), and more recently JavaScript Object Notation (JSON), adding to an already crowded set of existing formats. Furthermore, some data sources are not available directly, but through the use of an application programming interface (API), a web service, a representational state transfer (REST) service or other protocols that return unstructured data, such as weather information, twitter feeds, financial stock market data and so on. In addition, other systems provide data sources not easily consumable such as electromechanical devices, sensors and instrumentation components.

It can be very cumbersome, and sometimes impossible, for data analysts, business users and other systems to consume the disparate data sources in their native formats because they require specialized skill sets and/or hardware to consume each source of data. In addition to differences in the data source format, the content itself of a document is constructed by data source providers according to their needs and specifications; for example an XML document describing traffic conditions will be structurally different than a web service listing zip codes, which will be very different than an API accessing thermostats in a building. As a result, because these data sources are disparate, and most of them unstructured, it is not possible to uniformly query them directly in a manner that relational data sources can.

To solve this problem, developers typically use an intermediate relational database management system (RDBMS) to host the disparate data sources, create middleware, and then run batch or near-time integration tools to import the various data sets into the database, and create views or other database objects to query the data using Structured Query Language (SQL). While this solution is widely accepted today, it is vastly inefficient because it typically requires an intermediate storage engine, and cannot be used to query real-time sources of data since the information often needs to be stored first in an intermediate database before being queried.

As such, a need exists for methods and systems by which disparate data sources can look like relational data sources so that they can be queried uniformly in real-time without the need for an intermediate RDBMS.

DETAIL DESCRIPTIONS OF THE INVENTION

All illustrations of the drawings are for the purpose of describing selected versions of the present invention and are not intended to limit the scope of the present invention.

The present invention is a system and method for querying disparate data sources in real time. The primary purpose of the present invention is to retrieve data from multiple data sources, wherein the data can then be formatted and distributed to any number of client devices operating various data protocols via various interface transports. The system of the present invention provides a computing facility hereinafter referred to as a request proxy. The request proxy can provide a server, network of servers, or other suitable hardware capable of communicating with other client devices and third party data devices. A method for querying disparate data sources in real time is also provided and performed through the request proxy.

The method for querying disparate data sources includes processes for registering the virtual methods, functions and/or tables (virtual objects) of an at least one data adapter 20 in the request proxy and specifying a callback mechanism so that the at least one data adapter 20 receives incoming data requests from the request proxy in the form of programmatic events that contain both the virtual object and the virtual object's parameters. Each of the at least one data adapter 20 is an object library that can implement a plurality of methods 24, wherein the object library is developed to provide access to one or more third party devices, or data sources, in order to retrieve data requested by the client devices.

Another aspect of the method is to route the incoming request to the proper data adapter, when multiple data adapters are available. Although the request proxy is not a relational database management system (RDBMS), and as a result the request proxy does not expose databases per se, the request proxy can emulate virtual databases to the client devices, and use the virtual database name as the routing mechanism to forward the incoming request to the correct adapter from the at least one data adapter 20. While this is the preferred implementation of the present invention, other routing mechanisms are possible, such as routing incoming requests to the at least one data adapter 20 using a combination of database name, schema name, and/or the object name being requested.

Figure 11:
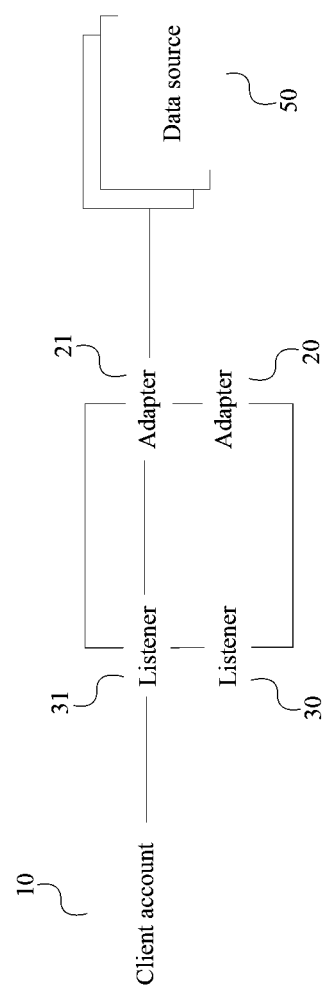
FIG. 11 is a diagram depicting the data flow between a client account and at least one data source through a request proxy.

The present invention further includes the use of a plurality of listeners 30; the plurality of listeners 30 being implemented through the request proxy along with the at least one data adapter 20, as depicted in FIG. 11. Each of the plurality of listeners 30 is associated with a data circuit, wherein each of the plurality of listeners 30 implements a data interface 32 that describes a data protocol by which digital information is communicated. For example, a listener could be provided for communicating with systems operating Structured Query Language (SQL) over Transmission Control Protocol (TCP)/Internet Protocol (IP), another for File Transfer Protocol (FTP), another for managing representational state transfer (REST) interaction, and another for servicing RS-232 originated requests from a universal asynchronous receiver/transmitter (UART).

Figure 1:
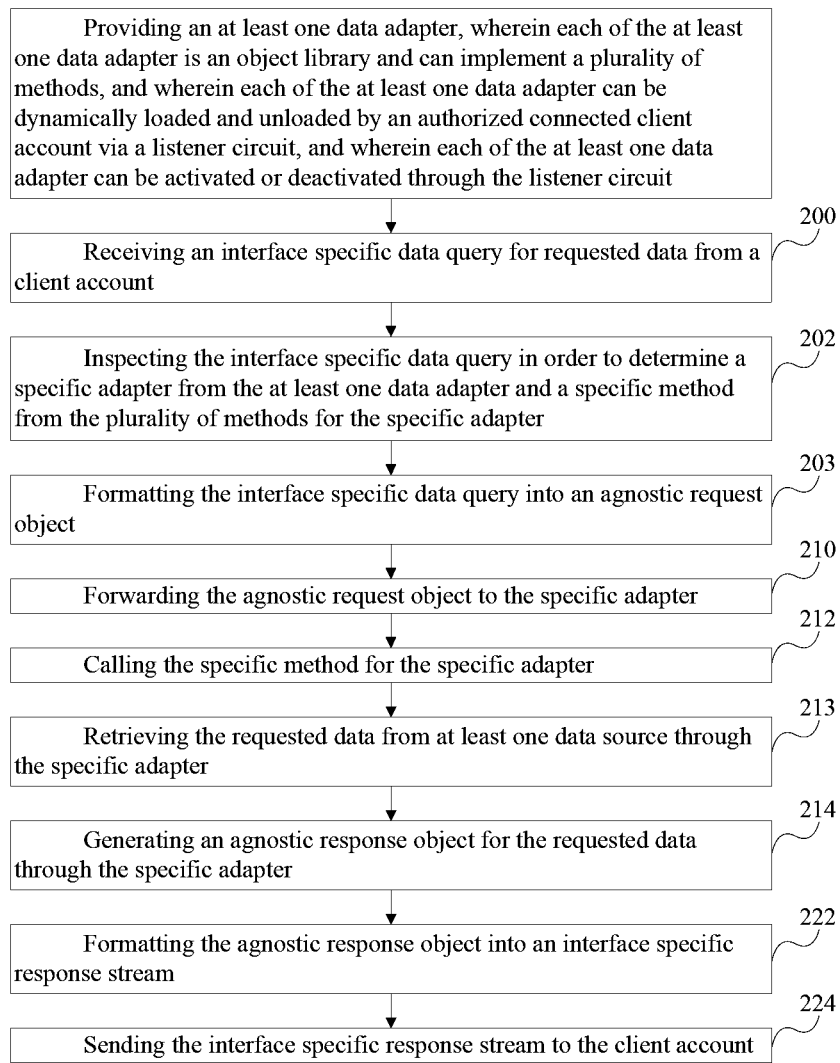
FIG. 1 is a flowchart detailing the overall process for querying disparate data sources in real time.

In reference to FIG. 1, a client account 10 sends out an interface specific data query 40 for requested data 70 through a client device, wherein the interface specific data query 40 is for a particular data protocol, such as SQL, FTP, REST, etc. The request proxy receives the interface specific data query 40 for the requested data 70 from the client account 10 over a circuit through a specific listener 31 from the plurality of listeners 30 [200, 201], wherein the specific listener 31 implements the data interface 32 for the particular data protocol.

In further reference to FIG. 1, once the interface specific data query 40 is received, the request proxy inspects the interface specific data query 40 in order to determine a specific adapter 21 from the at least one data adapter 20 and a specific method 25 from the plurality of methods 24 [202]. The specific adapter 21 being the adapter configured to communicate with the at least one data source 50 hosting the requested data 70, and the specific method 25 being the command called through the specific adapter 21. For example, if the requested data 70 is information pertaining to a social media website, then the specific adapter 21 called in the interface specific data query 40 would be configured to communicate exclusively with the social media website, while the specific method 25 would indicate the command used to retrieve information from the social media website.

Figure 2:
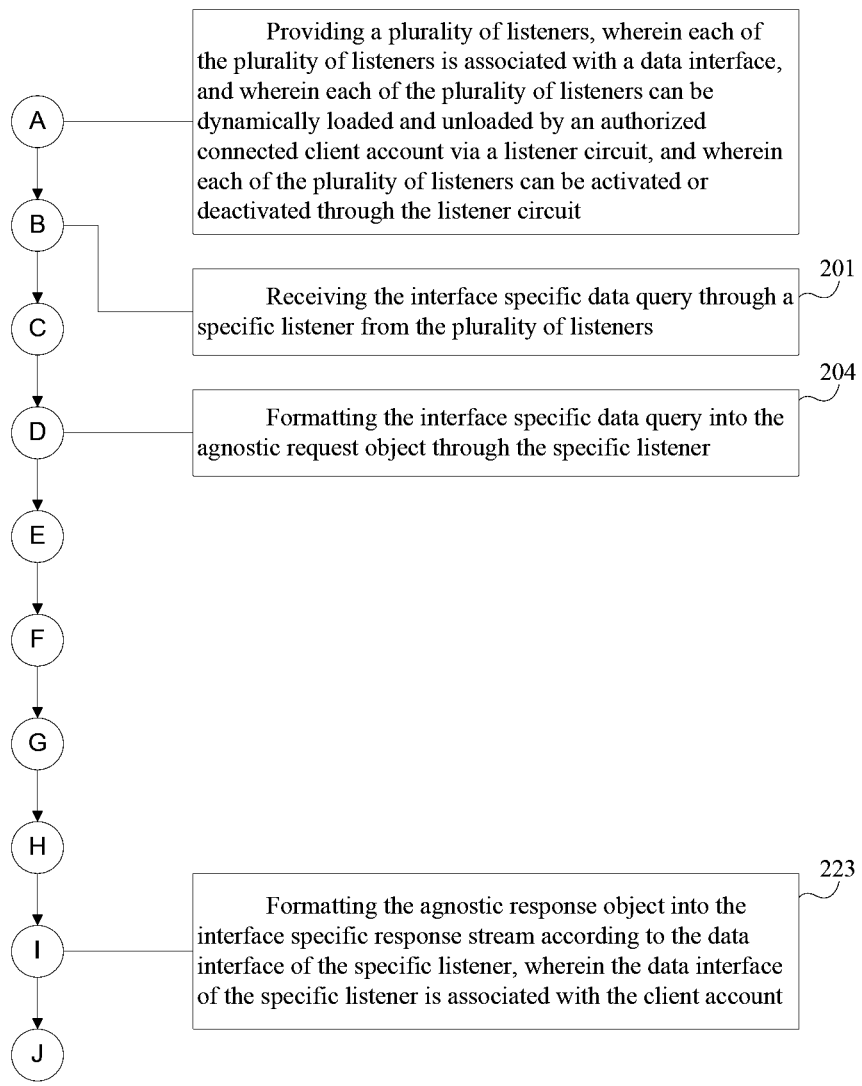
FIG. 2 is a flowchart thereof, expanding on the use of listeners to communicate with client accounts.

Once the request proxy determines the specific adapter 21 and the specific method 25 for the requested data 70, the request proxy formats the interface specific data query 40 into an agnostic request object 42 [203], wherein the agnostic request object 42 can be interpreted by each of the at least one data adapter 20 and contains the parameters for the requested data 70. More specifically, the interface specific data query 40 is formatted into the agnostic request object 42 through the specific listener 31 [204], as depicted in FIG. 2. The agnostic request object 42 may contain identification credentials 60 retrieved by the specific listener 31 from the interface specific data query 40 that pertains to a level of access to the specific adapter 21 for the client account 10. The identification credentials 60 can be provided within the interface specific data query 40 or through a payload sent with the interface specific data query 40.

The agnostic request object 42 provides a set of regulated instructions that can be interpreted by any of the at least one data adapter 20. In this way, even if multiple adapters are called in the interface specific data query 40, the request proxy only needs to transform the interface specific data query 40 once. The adapter name 23 for each adapter called by the interface specific data query 40 is retrieved and then the interface specific data query 40 is transformed into the agnostic request object 42, wherein the agnostic request object 42 can be forwarded to each of the adapters called in the interface specific data query 40.

Figure 5:
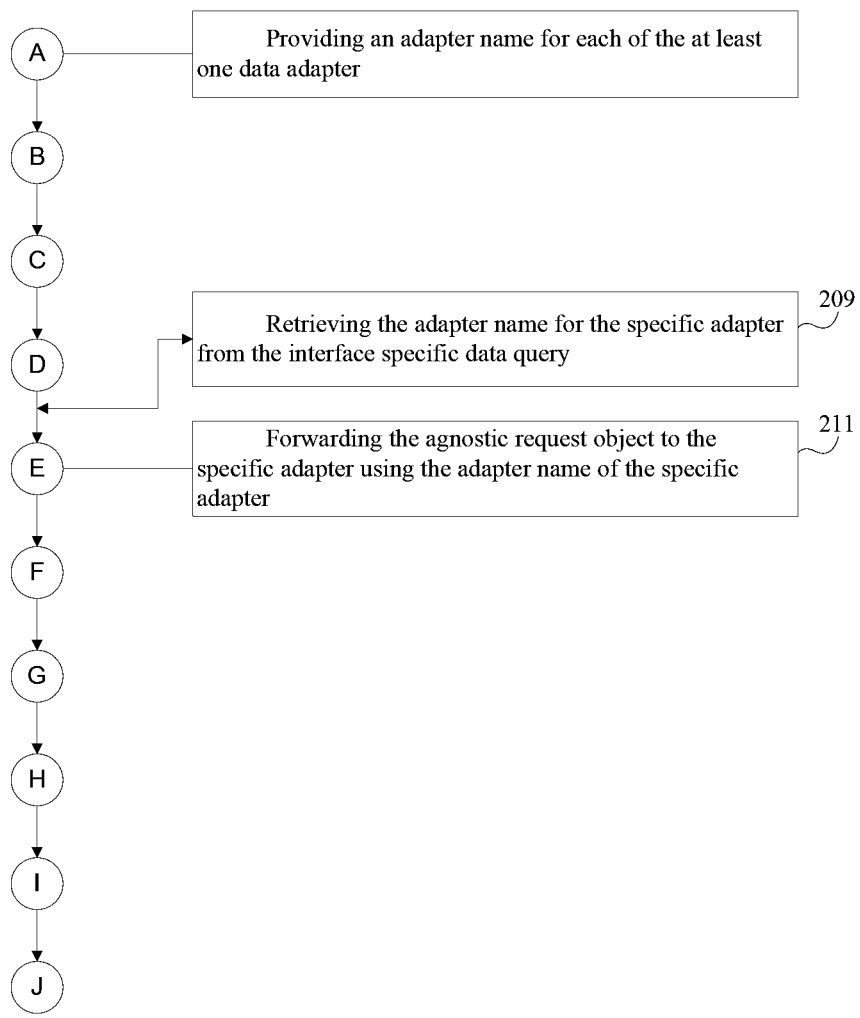
FIG. 5 is a flowchart thereof, further detailing steps for locating a specific adapter using an adapter name.

In reference to FIG. 1, once the request proxy has generated the agnostic request object 42, the request proxy forwards the agnostic request object 42 to the specific adapter 21 [210] and calls the specific method 25 for the specific adapter 21 [212]. In reference to FIG. 5, in the preferred embodiment of the present invention, each of the at least one data adapter 20 has an adapter name 23. When the interface specific data query 40 is received by the request proxy, the request proxy inspects the interface specific data query 40 and retrieves the adapter name 23 for the specific adapter 21 from the interface specific data query 40 [209]. The request proxy then uses the adapter name 23 of the specific adapter 21 to forward the agnostic request object 42 to the specific adapter 21 [211].

Figure 3:
FIG. 3 is a flowchart thereof, further detailing the steps of authenticating a client account through identification credentials.

In reference to FIG. 3, if the agnostic request object 42 contains the identification credentials 60 described above, then the identification credentials 60 are retrieved from the agnostic request object 42 by the request proxy [205]. The request proxy then authenticates the identification credentials 60 in order to determine the level of access to the specific adapter 21 for the client account 10 [206]. If the identification credentials 60 are verified, then access to the specific adapter 21 is allowed and if the identification credentials 60 cannot be verified, then access to the specific adapter 21 is denied. It is also possible for the identification credentials 60 to define limited access to the specific adapter 21. For example, the identification credentials 60 could allow the client account 10 access to the specific adapter 21, however, the client account 10 may be restricted to implementing only certain methods and results columns/entities from the plurality of methods 24 for the specific adapter 21.

The implementation of the identification credentials 60 into the agnostic request object 42 provides a platform for cross protocol authentication and authorization within the request proxy. The plurality of listeners 30 is configured to receive the interface specific data query 40 for various communication protocols and each of the plurality of listeners 30 is implemented to retrieve the identification credentials 60 sent in a particular protocol. However, each of the plurality of listeners 30 formats incoming data into the same regulated format, thus allowing the identification credentials 60 sent over various interfaces to be transformed into a common format.

Figure 6:
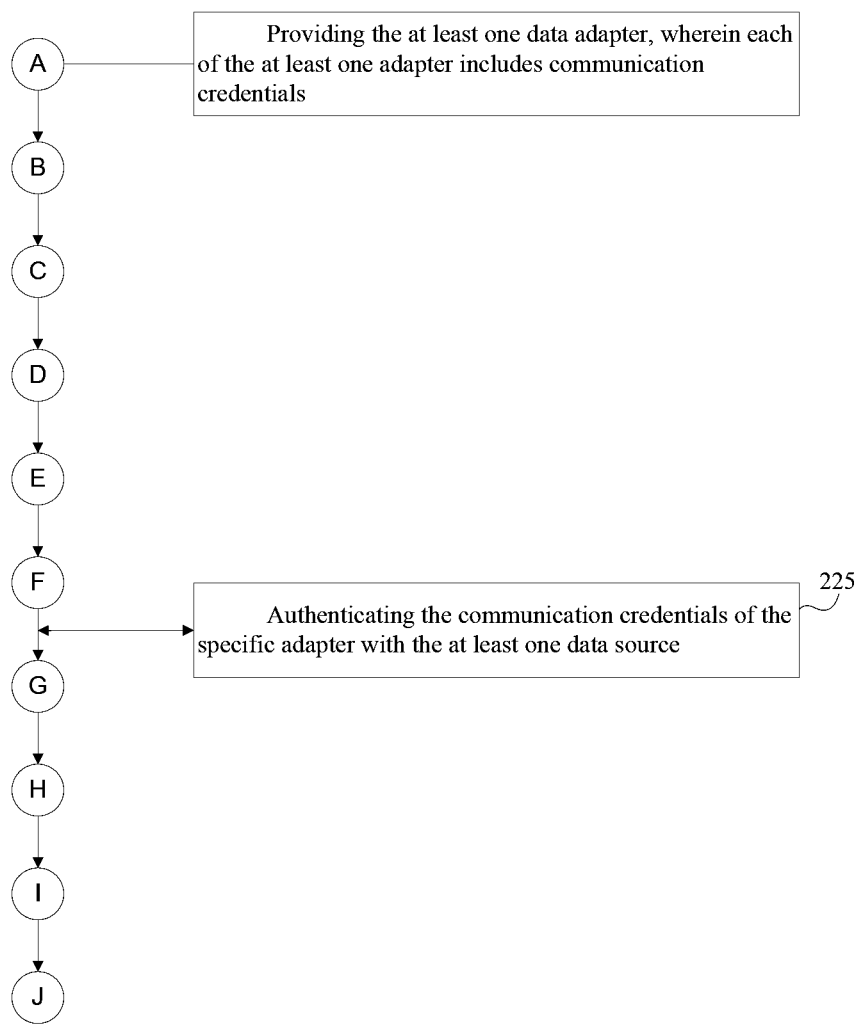
FIG. 6 is a flowchart thereof, detailing the authentication of communication credentials in order for the specific adapter to communicate with at least one data source.

In reference to FIG. 1, once the level of access to the specific adapter 21 has been determined and at least partial access to the specific adapter 21 has been authorized, the request proxy retrieves the requested data 70 from at least one data source 50 through the specific adapter 21 [213]. Each of the at least one data adapter 20 may also include communication credentials 61 for interacting with the at least one data source 50. For example, the specific adapter 21 for a social media website could have communication credentials 61 specific to the social media website. In reference to FIG. 6, the request proxy authenticates the communication credentials 61 of the specific adapter 21 with the at least one data source 50 in order to allow communication with the at least one data source 50 though the specific adapter 21 [225].

Figure 4:
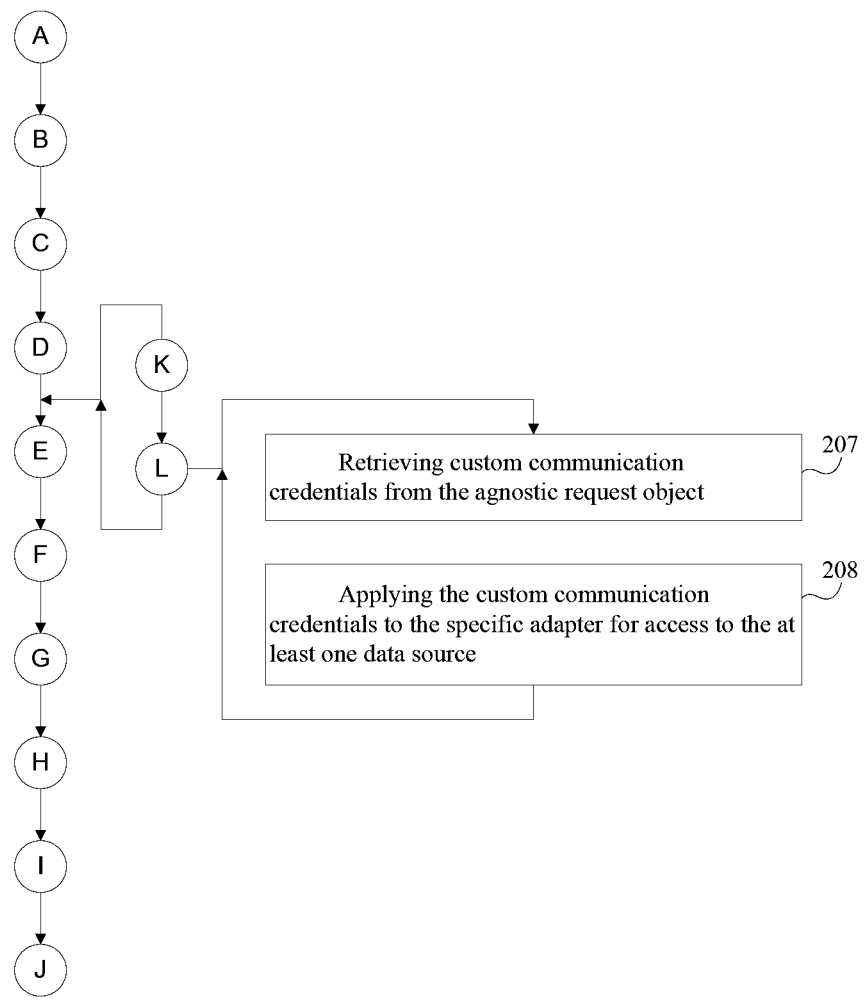
FIG. 4 is a flowchart thereof, further detailing the use of custom communication credentials from an authenticated client account.

It is also possible for the communication credentials 61 to vary based on the identification credentials 60 of the client account 10. For example, the identification credentials 60 for an employer account may define certain settings for the communication credentials 61, while the identification credentials 60 for an employee account may define different settings for the communication credentials 61. In reference to FIG. 4, depending on the level of access for the client account 10, the agnostic request object 42 may also contain custom communication credentials 62 defined by the user of the client account 10. In this way, base user's may be limited to default settings, while user's with approved clearance can define their own settings within the specific adapter 21. The request proxy retrieves the custom communication credentials 62 from the agnostic request object 42 [207], and applies the custom communication credentials 62 to the specific adapter 21 to provide access to the at least one data source 50 [208].

Session variables may be used throughout the communication between the specific adapter 21 and the at least one data source 50 in order to maintain state between calls within a given established session, and within the scope of the specific adapter 21. The session variables can be declared by the specific adapter 21 as client facing variables, or by the client account 10 as custom variables. The specific adapter 21 may also define a callback for the at least one data source 50 for services that require listening endpoints for additional security or for providing a status of operations. For example, the specific adapter 21 for a customer relationship management (CRM) system could declare a callback to provide an authentication token when the specific adapter 21 makes a request to the CRM system.

Figure 15:
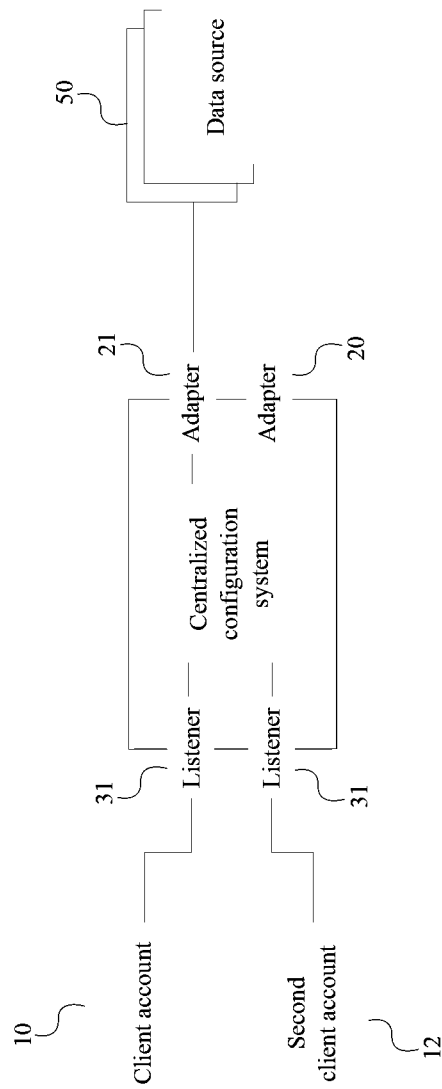
FIG. 15 is a diagram depicting a centralized configuration system within the request proxy, wherein the centralized configuration system can store communication credentials, application programming interface keys, etc. for communication between a specific adapter and at least one data source.

In reference to FIG. 15, the request proxy uses a centralized configuration system that allows for the access of many client accounts using the same data adapters that require unique and/or secure data source connections without the need for this redundant information to be included in the client account initiated requests. This also results in both increased security benefits and the ability to allow multi-tenant hosting of services abstracted by the request proxy. The centralized configuration system within the request proxy is accessible to authorized client account connections for the purposes of administration, and allows for the setting of request proxy instance, adapter specific, and user specific values while interacting with various data adapter requests. For example, a single data adapter from the at least one data adapter 20 may use a default of three retries when communicating with the target data source for the single data adapter. This setting can be the default for all accounts accessing said single data adapter. Likewise, a specific request proxy user account may require his/her own application programming interface (API) key to be used by the target data source of said single data adapter that will now be automatically available to said single data adapter without the initiating client account request having to supply said API key. This also allows for the protection of sensitive information that can be associated with a request proxy.

Figure 12:
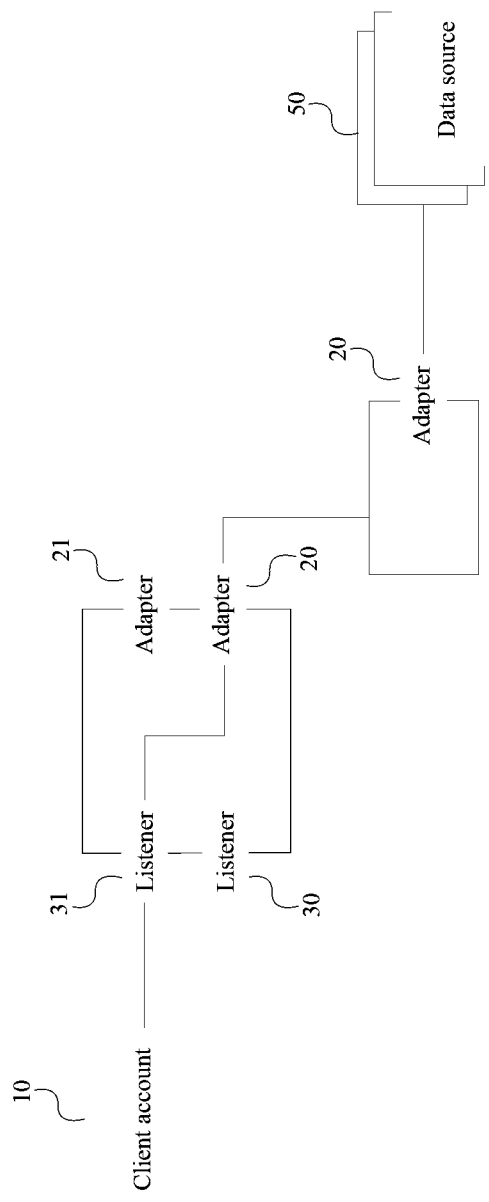
FIG. 12 is a diagram depicting the data flow between the client account and the at least one data source through the request proxy, wherein the specific adapter is in communication with a subsequent adapter on separate server.
Figure 13:
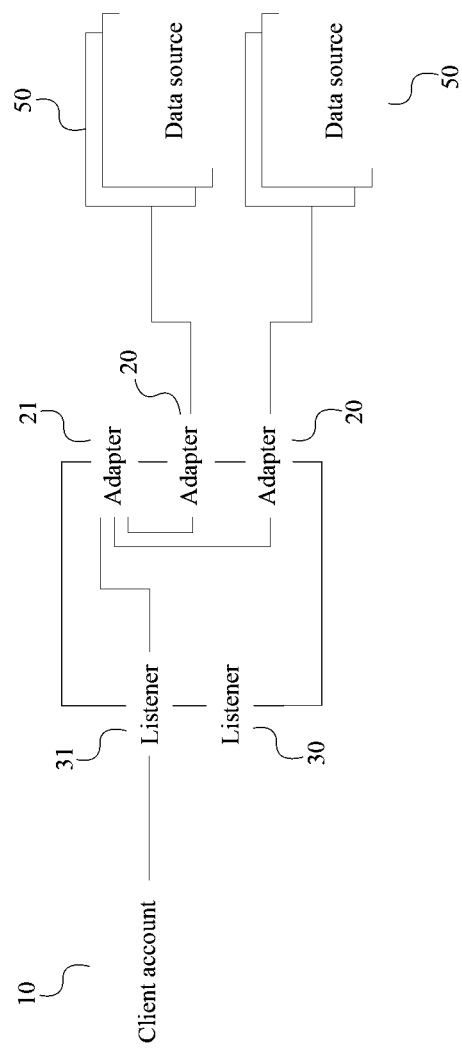
FIG. 13 is a diagram depicting the data flow between the client account and the at least one data source through the request proxy, wherein the specific adapter is in communication with the subsequent adapter being on the same server.

In reference to FIG. 12-13, the specific adapter 21 may also call on a subsequent adapter 22 from the at least one data adapter 20 in order to retrieve the requested data 70 from the at least one data source 50. In this way, the present invention provides the ability to create aggregate adapters that merge information from multiple adapters to provide a composite response. For example, the specific adapter 21 could be a general adapter for a plurality of social media websites. The specific adapter 21 would then call on a subsequent adapter 22 for each of the plurality of social media websites, wherein the subsequent adapter 22 for each of the plurality of social media websites is configured for a particular social media website.

It is also possible for the agnostic request object 42 to include scheduling data for execution at a later time, wherein the scheduling data dictates controlled times at which the agnostic request object 42 should request data from the at least one data source 50. For example, if the client account 10 wishes to request data about a particular subject once a week, the scheduling data could define a particular day of the week and a particular time of day to perform the request. Then, on the designated day and at the designated time, the request proxy would perform the scheduled request for data 70 through the specific adapter 21 to the at least one data source 50.

Figure 10:
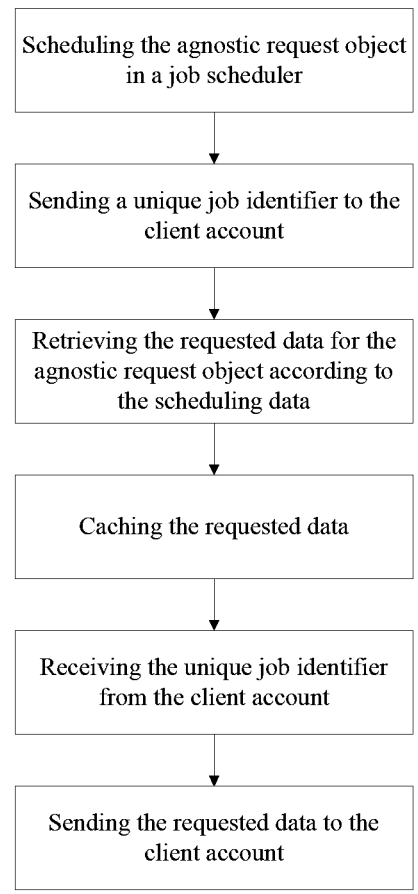
FIG. 10 is a flowchart depicting the steps for scheduling an agnostic request object in a job scheduler, such that requested data can later be retrieved by a client account.

In reference to FIG. 10, to schedule requests, the client account 10 includes the scheduling data in the interface specific data query 40, wherein the scheduling data specifies when the agnostic request object 42 should be executed at a future date and/or time and at an optional interval. Retrieval of the requested data 70 for the agnostic request object 42 is ultimately scheduled by the request proxy in a job scheduler to execute accordingly on the defined schedule. Upon successful scheduling of the agnostic request object 42, a unique job identifier is returned to the client account 10 that made the request through the listener circuit associated with the client account 10, where the client can use the unique job identifier to obtain the scheduled execution results at a later time or cancel the scheduled event altogether.

Figure 9:
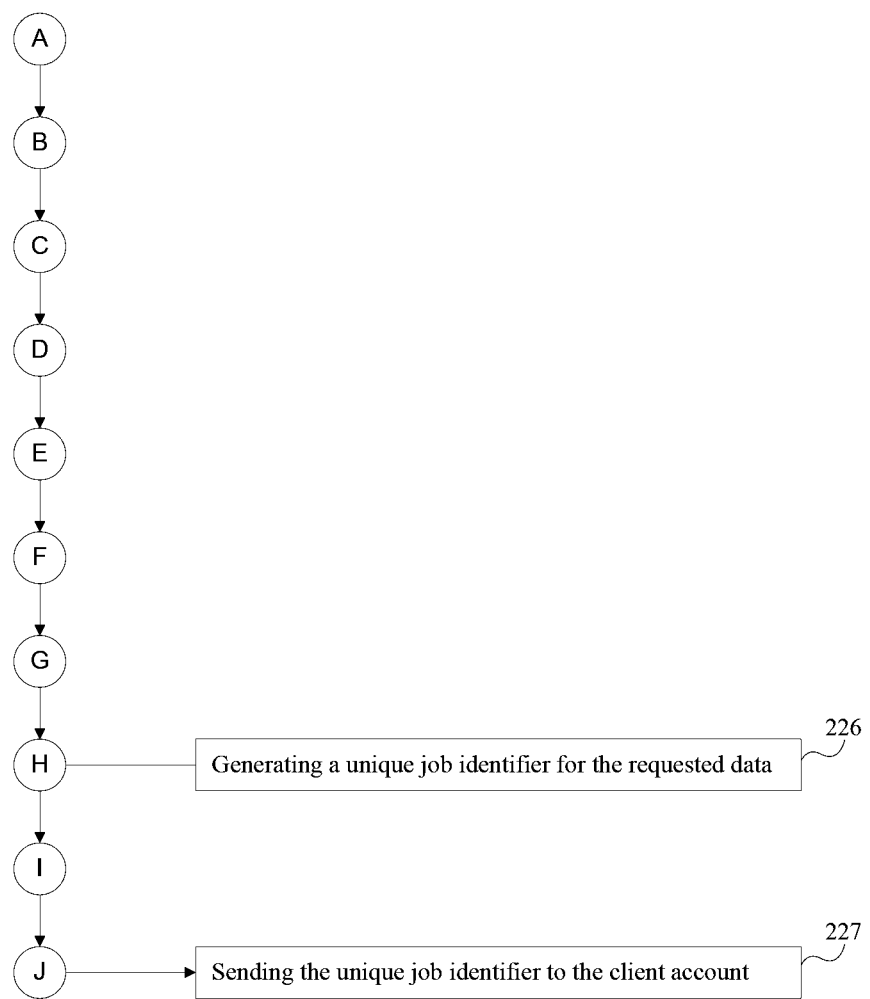
FIG. 9 is a flowchart thereof, further detailing the steps of generating a unique job identifier and sending the unique job identifier to the client account.

In reference to FIG. 9, if no schedule was requested, the interface specific data query 40 sent from the client account 10 is executed immediately although asynchronously and still returns a unique job identifier that can be used by a future interface data request to obtain the results of that asynchronous request. The unique job identifier is generated by the request proxy for the requested data 70 [226], and the unique job identifier is then sent to the client account 10 [227], such that the client account 10 can again retrieve the requested data 70 at a later time.

Another example of scheduling is the proactive caching of results, whereas a scheduled request could be executed by the request proxy on the last Friday of every month at midnight to retrieve results to cache for future client requests, as depicted in FIG. 10.

It is yet another possibility for the agnostic request object 42 to define an event trigger, wherein the data is retrieved according to a specific event occurring. This is especially beneficial in direct monitoring systems. For example, if environmental factors are being monitored in real time, the event trigger could be defined such that the specific adapter 21 retrieves the requested data 70 every time the temperature in the monitored environment reaches a certain threshold. Or, when a new file is deposited in a monitored directory, the contents of the new file could be retrieved and the event pushed to the subscribed client.

In reference to FIG. 1, once the request proxy retrieves the requested data 70 through the specific adapter 21, the request proxy generates an agnostic response object 43 from the requested data 70. More specifically, the agnostic response object 43 is generated by the request proxy through the specific adapter 21 [214]. The agnostic response object 43 is a generically formatted set of data that can be reformatted and distributed through the plurality of listeners 30. The agnostic response object 43 contains the requested data 70 formatted into a plurality of rows and a plurality of columns. Additionally, the plurality of rows and the plurality of columns for the requested data 70 can be arranged into a plurality of result sets rather than being limited to a single table or data set. It is also possible for the requested data 70 to be filtered by the specific adapter 21 according to limitations defined by the specific adapter 21 or the client account 10.

In further reference to FIG. 1, once the requested data 70 has been formatted into the agnostic response object 43, the request proxy formats the agnostic response object 43 into a interface specific response stream 44 [222] and sends the protocol response stream to the client account 10 through the client device [224]. More specifically, the agnostic response object 43 is formatted into the interface specific response stream 44 according to the data interface 32 of the specific listener 31 through which the interface specific response stream 44 is sent to the client account 10, wherein the data interface 32 of the specific listener 31 is associated with that of the client account 10 [223].

Figure 7:
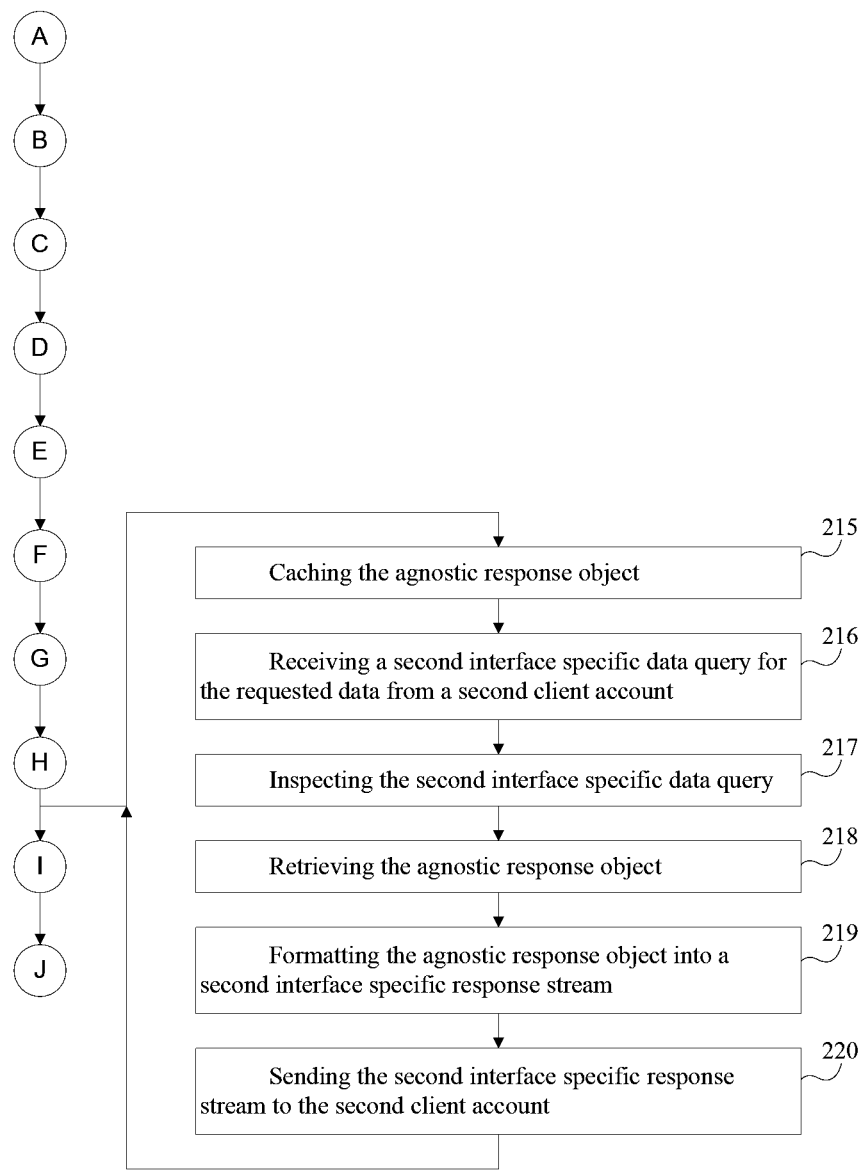
FIG. 7 is a flowchart thereof, detailing the steps of accessing and formatting data that has been previously requested and cached.
Figure 14:
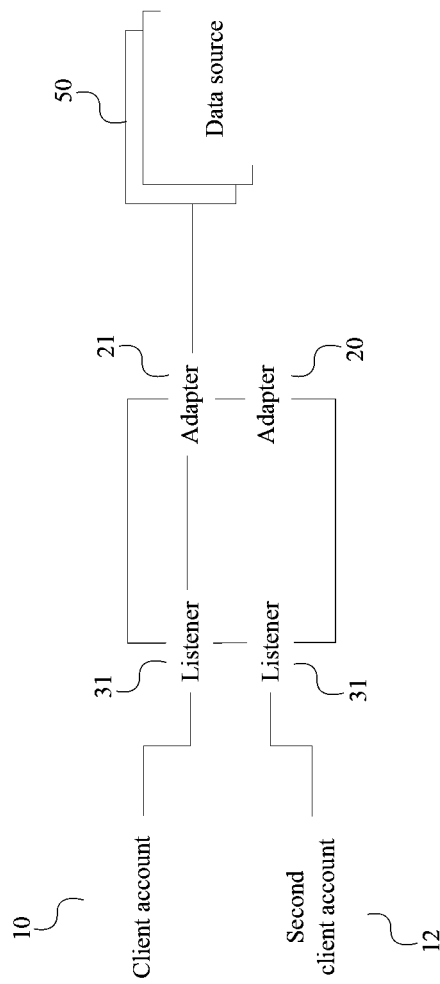
FIG. 14 is a diagram depicting the data flow between a second client account and the request proxy, wherein the second client account is requesting data previously retrieved by the client account and cached on the request proxy.

In reference to FIG. 7, it is also possible for the agnostic response object 43 to be cached by the request proxy once the agnostic response object 43 has been generated [215]. In this way, if the same data is requested by the client account 10 at a later time or by another client account 10 as depicted in FIG. 14, then the request proxy can simply access the cached version of the agnostic response object 43. The cached version of the agnostic response object 43 is then formatted according to the appropriate data protocol and distributed to the device making the request for data. For example, if the client account 10 makes the same request, then the agnostic response object 43 is retrieved and formatted into the interface specific response stream 44 according to the data interface 32 of the specific listener 31 associated with the client account 10.

Figure 8:
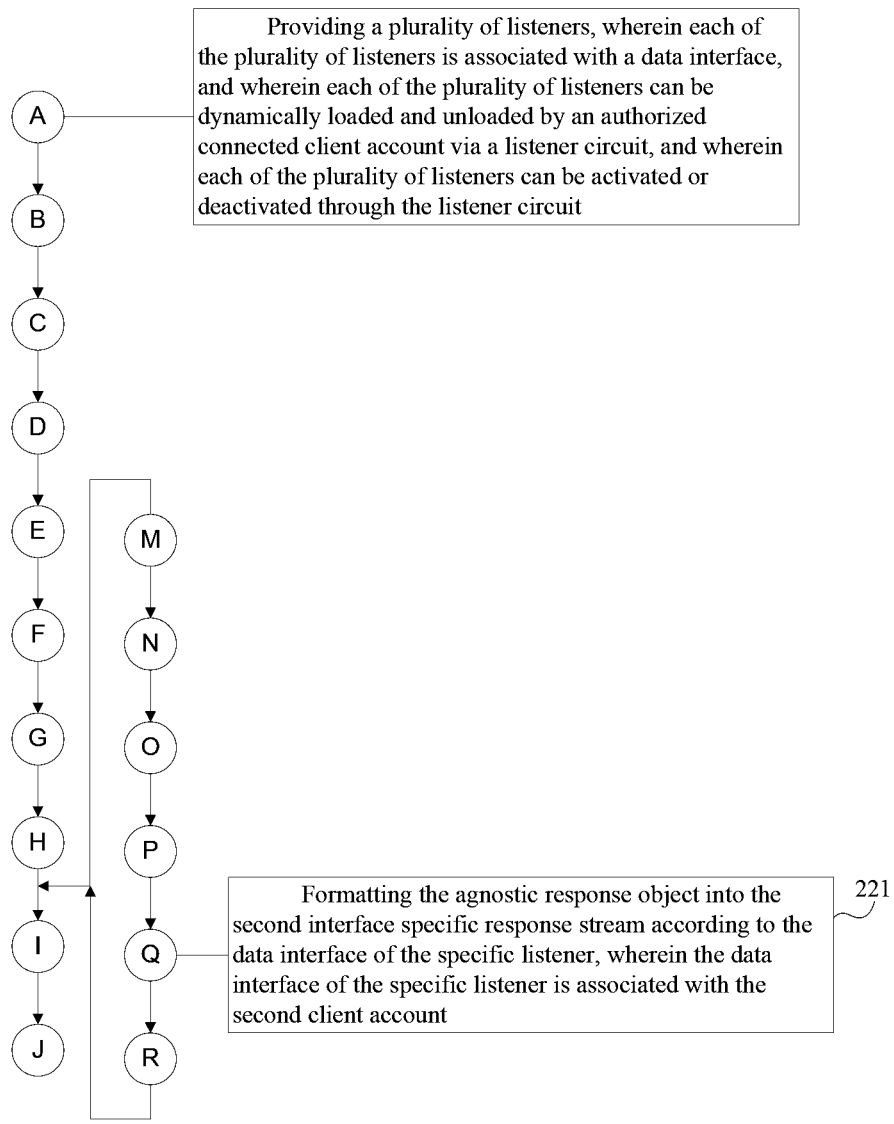
FIG. 8 is a flowchart thereof, further detailing the steps of formatting requested data to be sent through the specific adapter for a second client account.

In reference to FIG. 7-8, in another situation, the request proxy may receive a second interface specific data query 41 for the requested data 70 from a second client account 12 [216]. The request proxy inspects the second interface specific data query 41 [217] and upon determining that the second protocol data query is for the requested data 70 from the interface specific data query 40, the request proxy retrieves the agnostic response object 43 for the requested data 70 [218]. Once the agnostic response object 43 is retrieved, the request proxy formats the agnostic response object 43 into a second interface specific response stream 45 according to the data interface 32 of the specific listener 31 associated with the second client account 12 [219, 221]. The second interface specific response stream 45 is then sent to the second client account 12 by the request proxy through the specific listener 31 associated with the second client account 12 [220].

In reference to FIG. 1-2, it is important to note that each of the plurality of listeners 30, each of the at least one data adapter 20, and authentication handlers can be dynamically loaded and unloaded by an authorized connected client account via a connected listener circuit without the need to stop and restart the request proxy. This allows for adding, removing, and upgrading the request proxy accordingly.

In further reference to FIG. 1-2, the request proxy is also managed via listener circuits using authenticated client account sessions, wherein the request proxy can return internal information about itself, as well as allow for the activation and deactivation of each of the plurality of listeners 30, each of the at least one data adapter 20, and any other mechanisms the request proxy might expose through said means.

If the request proxy is configured as such, detailed access to each of the plurality of listeners 30, each of the at least one data adapter 20, and any other request proxy environment event or changes are recorded. This allows for internal algorithms to dynamically make adjustments in the request proxy's performance. And for the purposes of billing and/or auditing, detailed logging is supplied containing the origin of the request (including the request proxy account and available listener details), what was requested, what was returned, how much was returned, and what, if any, effort was involved. This also allows for the comprehensive accounting and auditing of any interested parties, especially in a hosted environment.

Although the invention has been explained in relation to its preferred embodiment, it is to be understood that many other possible modifications and variations can be made without departing from the spirit and scope of the invention as hereinafter claimed.

What is claimed is:

1. A method for querying disparate data sources in real time by executing computer-executable instructions stored on a non-transitory computer-readable medium, the method comprises the steps of:

providing at least one dynamically loaded data adapter, wherein each of the at least one dynamically loaded data adapter is an object library and is used to implement a plurality of methods;

receiving an interface data query from a user;

inspecting the interface data query in order to determine an adapter from the at least one dynamically loaded data adapter;

formatting the interface data query into an agnostic request object;

providing an adapter name for each of the at least one dynamically loaded data adapter;

retrieving the adapter name for the adapter from the interface data query;

forwarding the agnostic request object to the adapter using the adapter name of the adapter;

calling the adapter;

retrieving the requested data from at least one data source through the adapter;

generating an agnostic response object for the requested data through the adapter;

formatting the agnostic response object into an interface response stream;

sending the interface response stream to the user;

the agnostic response object represents a plurality of rows and a plurality of columns;

retrieving identification credentials from the agnostic request object; and authenticating the identification credentials in order to determine a level of access to the adapter.

2. The method for querying disparate data sources in real time by executing computer-executable instructions stored on a non-transitory computer-readable medium, the method as claimed in claim 1 further comprises the steps of:

providing a plurality of listeners, wherein each of the plurality of listeners is associated with a data interface; and receiving the authenticated interface data query through a listener from the plurality of listeners.

3. The method for querying disparate data sources in real time by executing computer-executable instructions stored on a non-transitory computer-readable medium, the method as claimed in claim 2 further comprises the steps of:

formatting the authenticated interface data query into the agnostic request object through the listener.

4. The method for querying disparate data sources in real time by executing computer-executable instructions stored on a non-transitory computer-readable medium, the method as claimed in claim 2 further comprises the steps of:

formatting the agnostic response object into the interface response stream according to the data interface of the listener, wherein the data interface of the listener is associated with the user.

5. The method for querying disparate data sources in real time by executing computer-executable instructions stored on a non-transitory computer-readable medium, the method as claimed in claim 1, wherein the agnostic request object contains identification credentials provided within the authenticated interface data query.

6. The method for querying disparate data sources in real time by executing computer-executable instructions stored on a non-transitory computer-readable medium, the method as claimed in claim 1, wherein the agnostic request object contains identification credentials provided through a payload sent with the authenticated interface data query.

7. The method for querying disparate data sources in real time by executing computer-executable instructions stored on a non-transitory computer-readable medium, the method as claimed in claim 1, wherein the plurality of rows and the plurality of columns are arranged into a plurality of result sets.

8. The method of querying disparate data sources in real time by executing computer-executable instructions stored on a non-transitory computer-readable medium, the method as claimed in claim 1 further comprises the steps of:

caching the agnostic response object;

receiving a second authenticated interface data query for the requested data from a second user;

inspecting the second authenticated interface data query;

retrieving the agnostic response object;

formatting the agnostic response object into a second interface response stream; and sending the second interface response stream to the second user.

9. The method for querying disparate data sources in real time by executing computer-executable instructions stored on a non-transitory computer-readable medium, the method as claimed in claim 8 further comprises the steps of:

providing a plurality of listeners, wherein each of the plurality of listeners is associated with a data interface; and formatting the agnostic response object into the second interface response stream according to the data interface of a listener from the plurality of listeners, wherein the data interface of the listener is associated with the second user.

10. The method for querying disparate data sources in real time by executing computer-executable instructions stored on a non-transitory computer-readable medium, the method as claimed in claim 1 further comprises the steps of:

retrieving custom communication credentials from the agnostic request object; and applying the custom communication credentials to the adapter for access to the at least one data source.

11. The method for querying disparate data sources in real time by executing computer-executable instructions stored on a non-transitory computer-readable medium, the method as claimed in claim 1 further comprises the steps of:

providing the at least one dynamically loaded data adapter, wherein each of the at least one dynamically loaded data adapter includes communication credentials; and authenticating the communication credentials of the adapter with the at least one data source.

12. The method for querying disparate data sources in real time by executing computer-executable instructions stored on a non-transitory computer-readable medium, the method as claimed in claim 1, wherein the adapter calls on a subsequent adapter from the at least one dynamically loaded data adapter in order to retrieve the requested data from the at least one data source.

13. The method for querying disparate data sources in real time by executing computer-executable instructions stored on a non-transitory computer-readable medium, the method as claimed in claim 1, wherein the adapter defines a callback for the at least one data source.

14. The method for querying disparate data sources in real time by executing computer-executable instructions stored on a non-transitory computer-readable medium, the method as claimed in claim 1, wherein session variables are implemented for communication between the adapter and the at least one data source.

15. The method for querying disparate data sources in real time by executing computer-executable instructions stored on a non-transitory computer-readable medium, the method as claimed in claim 1, wherein the requested data is filtered by the adapter.

16. The method for querying disparate data sources in real time by executing computer-executable instructions stored on a non-transitory computer-readable medium, the method as claimed in claim 1, wherein the requested data is retrieved according to scheduling data defined by the agnostic request object.

17. The method for querying disparate data sources in real time by executing computer-executable instructions stored on a non-transitory computer-readable medium, the method as claimed in claim 1, wherein the requested data is retrieved according to an event trigger defined by the agnostic request object.

* * * * *